United States Patent
Du Val et al.

(10) Patent No.: US 8,654,262 B2
(45) Date of Patent: Feb. 18, 2014

(54) CONTENT DELIVERY TO A DIGITAL TV USING A LOW-POWER FREQUENCY CONVERTED RF SIGNAL

(75) Inventors: Jordan Du Val, Sunnyvale, CA (US); Herbert Kniess, San Jose, CA (US)

(73) Assignee: Meld Technology Inc., Sunnyvale, CA (US)

( * ) Notice: Subject to any disclaimer, the term of this patent is extended or adjusted under 35 U.S.C. 154(b) by 186 days.

(21) Appl. No.: 13/224,272

(22) Filed: Sep. 1, 2011

(65) Prior Publication Data

US 2012/0017248 A1 Jan. 19, 2012

Related U.S. Application Data

(63) Continuation of application No. 11/740,685, filed on Apr. 26, 2007, now Pat. No. 8,063,996.

(60) Provisional application No. 60/794,935, filed on Apr. 27, 2006.

(51) Int. Cl.
*H04N 5/44* (2011.01)
*H04N 5/50* (2006.01)
*H04N 7/18* (2006.01)
*H04W 4/00* (2009.01)

(52) U.S. Cl.
USPC ............ 348/725; 348/731; 348/734; 725/81; 370/328

(58) Field of Classification Search
None
See application file for complete search history.

(56) References Cited

U.S. PATENT DOCUMENTS

| | | | |
|---|---|---|---|
| 5,243,415 A * | 9/1993 | Vance | 725/81 |
| 5,708,961 A * | 1/1998 | Hylton et al. | 725/81 |
| 6,263,503 B1 * | 7/2001 | Margulis | 725/81 |
| 2001/0019948 A1 * | 9/2001 | Obitsu | 455/193.1 |
| 2001/0021998 A1 * | 9/2001 | Margulis | 725/81 |
| 2003/0193619 A1 * | 10/2003 | Farrand | 348/731 |
| 2006/0190972 A1 * | 8/2006 | Kasamatsu et al. | 725/81 |
| 2006/0209745 A1 * | 9/2006 | MacMullan et al. | 370/328 |
| 2007/0089144 A1 * | 4/2007 | Du Breuil et al. | 725/81 |
| 2007/0236613 A1 * | 10/2007 | Foss | 348/734 |

* cited by examiner

*Primary Examiner* — Jefferey Harold
*Assistant Examiner* — Sean Haiem
(74) *Attorney, Agent, or Firm* — Patent Law Group LLP; Brian D Ogonowsky

(57) ABSTRACT

A simple antenna is connected to the RF input port on a conventional digital TV to receive video content from a plurality of video content sources wirelessly. The wireless RF transmission by a local transmitter has a range generally limited to within a home or room. The low power RF transmission is on a carrier frequency that is legally authorized by the FCC in frequency and power level. To identify the open channels for the RF transmission, a tuner scans for weak channels, and the transmitter is tuned to transmit on the detected weak channels.

22 Claims, 5 Drawing Sheets

CONTENT DELIVERY TO A DIGITAL TV USING A LOW-POWER FREQUENCY CONVERTED RF SIGNAL

CROSS-REFERENCE TO RELATED APPLICATIONS

This application is a continuation of U.S. application Ser. No. 11/740,685, filed on Apr. 26, 2007, now U.S. Pat. No. 8,063,996, which claimed priority to provisional application Ser. No. 60/794,935, filed on Apr. 27, 2006, entitled Content Delivery to a Digital TV Using a Low-Power Frequency Converted RF Signal, by Jordan Du Val.

FIELD OF THE INVENTION

The invention relates to a method and system for enabling the wireless reception of a plurality of content sources by the RF input of a digital TV.

BACKGROUND

Digital and analog TVs have a plurality of inputs for video content sources, typically located on the back of the TV. These inputs typically include a Radio Frequency (RF) input, for the antenna/cable, and baseband inputs for S-video, CVBS, HDMI, and other types of baseband inputs.

The RF signal has the video content modulated on a carrier frequency. Baseband signals input directly into the television are not modulated on a carrier frequency. To receive RF signals, the user must first tune to the desired channel frequency by using a tuner (e.g., tune to 67.25 MHz to see content on broadcast Channel 4). The tuner can be found inside the TV or in a set-top-box (STB) connected to the TV. Composite or S-Video outputs of DVD players and VCRs are examples of baseband signals that do not require the TV's tuner. To view the video content applied to the baseband inputs of the TV, the user typically sets the input source using the TV's remote control.

RF signals can come into the TV either from an antenna on the TV or more commonly from a coaxial cable that is connected to an external TV antenna or cable feed from the local cable operator.

Using a small "rabbit ear" antenna directly on a TV is not a popular solution as these antennas are usually low-gain with limited reception capability. Bigger higher gain antennas are better at receiving weak signals. The input signal from the desired channel could be very weak as the TV transmitter could be located miles away from the receiving antenna. Another reason why antenna inputs are not popular is they are limited to receiving content only from terrestrial broadcasters (TV stations).

Typically the user must first connect wires from the signal source to the appropriate input connector on the TV, either the RF input or appropriate baseband input. This necessitates running RF or baseband audio/video wires from a content source (set top box, DVD, cable, TiVo, game console) to the TV. When TVs were large wooden boxes containing heavy CRTs, this was not a problem. There was usually plenty of space to hide wires behind the TV or somewhere in a large audio/video (A/V) cabinet. However, with the rising popularity of thin, flat screen LCD TVs and plasma display TVs, the aesthetics and practicality of running a variety of A/V wires from a source to the TV is compromised. Flat TVs do not need a lot of space and can be situated practically anywhere. For example many consumers may like to hang flat TVs on their walls like a picture. This creates a challenge: how does one get content to a flat TV without having to run a bunch of A/V wires? Reverting to "rabbit ear" antennas would not offer good reception, and this approach is limited to receiving only terrestrial TV broadcasts. This will not help the flat TV in receiving other types of content commonly available in the home, such as cable TV channels or a movie played from a DVD player.

Therefore, a method and system for enabling the wireless reception of a plurality of content sources by the RF input of a digital TV is highly desirable.

SUMMARY

In view of the foregoing disadvantages inherent in the known types of TV signal connectivity options now present in the prior art, the present invention provides a system and method whereby a user can use a simple low-cost antenna connected to the RF input connector on a conventional digital TV to receive a plurality of A/V content sources wirelessly.

The general function of the present invention, which will be described subsequently in greater detail, is to transmit the A/V content to the digital TV via a Local Content Converter (LCC). The content sources are connected to the LCC, which contains a low power RF transmitter whose range is generally limited to within a home or room. A small antenna is directly attached to the RF input of the digital TV to receive the low power RF transmission. The antenna may typically be located behind the TV so as not to be seen. The low power RF transmission is on a carrier frequency that is legally authorized by the FCC, such as cable channel 57, 421.25 MHz, or any other channel frequency. The LCC converts the baseband signals (or other type of original format signal) from the content sources, which may be in a variety of formats, to a standardized RF format that is normally received by a conventional digital TV at its RF input. The TV then suitable converts the RF signal for displaying/playing the A/V content.

In another embodiment, the output of the LCC is directly connected to the RF input of the digital TV using a coaxial cable.

In another embodiment, the LCC legally transmits, via an antenna, at a frequency within the ISM band (Industrial, Scientific, Medical band), and an ISM receiver connected to an input of the digital TV receives the RF signal. The ISM receiver then suitably converts the received signal into a signal that can be processed by the TV.

To identify the open channels for the RF transmission, a tuner scans for weak channels, and the transmitter is tuned to transmit on the detected weak channels.

This system and method has many of the advantages over other connectivity options mentioned heretofore. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a robust system and method that will overcome the shortcomings of the prior art solutions.

A second object is to provide a system that utilizes the existing RF reception capability of the digital TV to receive content from a plurality sources wirelessly without the need of additional electronics in the TV itself.

A further object is to provide a wireless content delivery system that is simple and easy to utilize for the average consumer.

Another object is to provide a solution that does not require significant programming prior to usage.

An additional object is to provide a system that is affordable.

Other objects and advantages of the present invention will become obvious to the reader and it is intended that these objects and advantages be within the scope of the present invention.

BRIEF DESCRIPTION OF THE DRAWINGS

The accompanying drawings, which are incorporated in and constitute a part of this specification, illustrate systems and methods consistent with the invention and, together with the description, serve to explain the advantages, and principles of the invention.

DETAILED DESCRIPTION

Local Content Converter (LCC) System

The present invention provides a method and a system for enabling the wireless reception of a plurality of content sources by the RF input of a digital TV. This is achieved by converting the input signals into a signal compatible with the RF input of a conventional digital TV.

Figure 1:
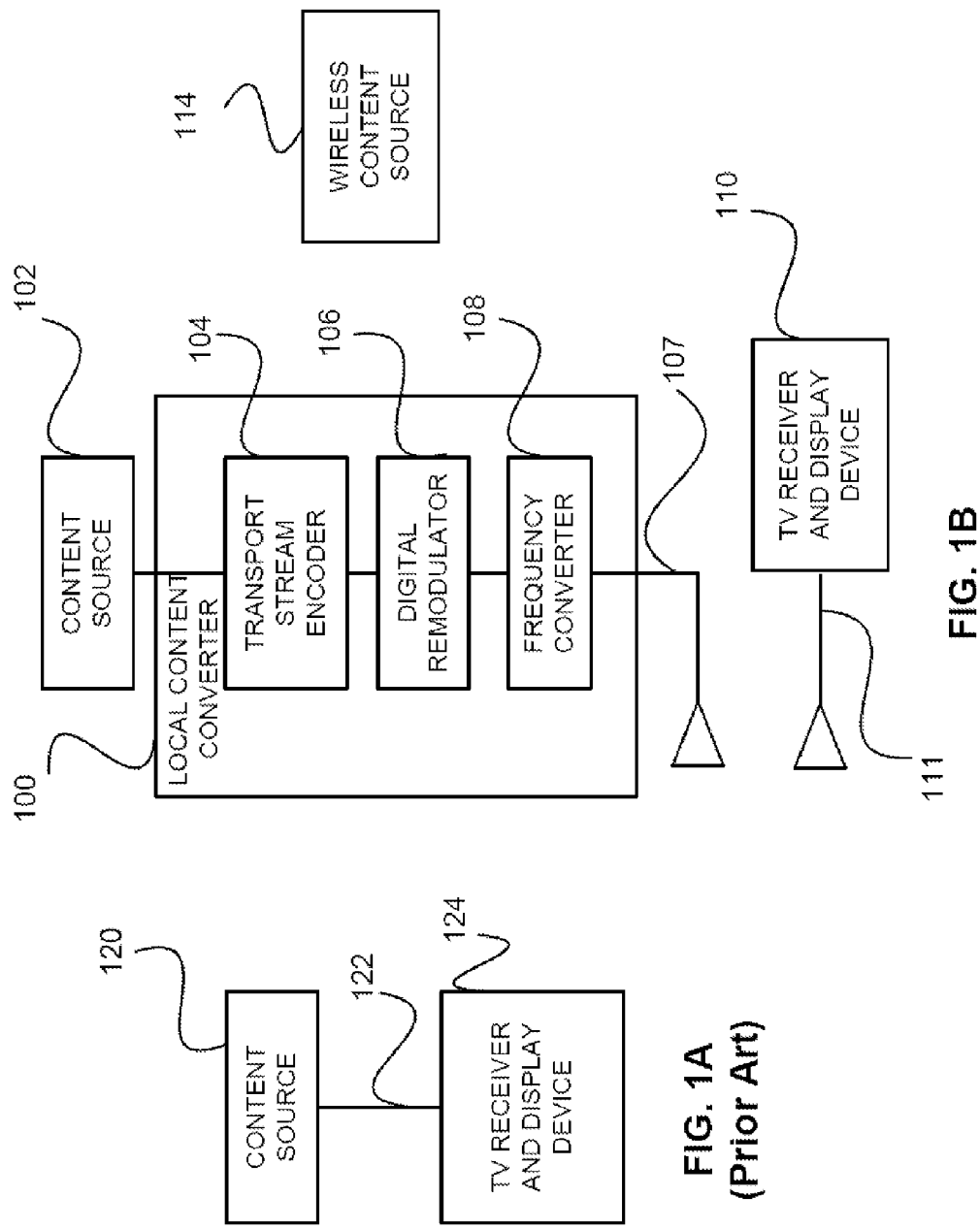
FIG. 1A is a block diagram of a prior art entertainment system for displaying images on a TV from a content source.
FIG. 1B is a block diagram of a local content converter (LCC) system used to transmit video images to a TV in accordance with one embodiment of the invention.

Prior art FIG. 1A illustrates a TV 124 and a content source device 120. Wires 122 connect the audio/video output of the content source to the baseband inputs of the TV 124. However, this arrangement may not be desirable or practical if the two devices reside far apart from each other or if the TV is installed in such a fashion that the wires 122 would be obtrusive.

FIG. 1B illustrates one embodiment of the invention. The user connects a local content converter (LCC) 100 to at least one conventional content source 102 and connects a small antenna 111 to the back of the TV 110. The LCC 100 takes the input signal and converts it into a digital broadcast format native to the TV's own RF input handling capabilities so the TV does not distinguish between the signal transmitted by the LCC 100 and a conventional RF signal applied to its RF input port. The TV remains tuned to the LCC's "local" channel to receive a video/audio signal from the content source 102. The local channel is typically any channel, which is not intended for commercial TV broadcast. The FCC has identified all of these allowable frequencies within a typical TV's RF input's frequency range of 55.25 MHz to 997.25 MHz, along with the maximum allowable field strength, and such allowable frequencies are publicly available. In one embodiment, the LCC 100 generates an RF signal in the cable television channel frequency range of 289.25 MHz-883.25 MHz.

The LCC 100 includes a transport stream encoder 104, a digital remodulator 106, and a frequency converter/transmitter 108. Also shown are a conventional digital television receiver 110 and a content source 102.

The TV receiver 110 is compatible with conventional terrestrial or cable analog or digital standard broadcast signals such as NTSC, ATSC (digital television), QAM, DVB-C/T, ISDB-T/C, and PAL type television signals.

The LCC 100 provides content to television receiver 110 in a format compatible with digital TV terrestrial or cable transmission or any other format used to display images on a television.

LCC 100 transmits content wirelessly from its antenna 107 to a receiving antenna 111 on the TV receiver 110. The wireless connection enables the LCC 100 to broadcast images to one or more televisions in a nearby area without physical cabling. The LCC 100 can also receive content from external devices (wireless content sources 114) over an input terminal having a wireless connection, a physical connection, or a combination of both. The LCC output (shown connected to antenna 107) could alternatively be connected to the standard video RF input terminal on television 110 using a coax cable if desired, such as if there were interference in the RF transmission.

The content source 102 can be a conventional DVD player, set top box (a cable or satellite decoder box), computer, or any other device that produces image data. The connection between the video content source 102 and the LCC 100 may be any type of digital and/or analog stream connection, S-Video, CVBS, PAL, YbPbR, RBG, HDMI, or any other type of video format link having a standard physical interface. Modern video content sources typically couple baseband signals to the back of a digital TV using phono plugs, and there may be twenty or more phono plug receptacles on the back of the TV to accommodate multiple plugs per source and multiple sources. There is typically only one RF coax input receptacle on the back of a TV for connection to a cable box or an antenna. The LCC 100, in one embodiment, has phono plug receptacles as video content inputs resembling the back of the TV. The video content sources plug into the LCC 100 just as they would plug into the back of the TV. The LCC 100 then converts these baseband signals into an RF transmission that is received by the small antenna 111 connected to the RF input of the TV, where the format of the RF transmission is the type that is normally received by the TV for demodulation, decoding, and displaying on the TV screen.

A wireless content source 114 can be used to send video content over a wireless connection to the LCC 100 rather than a physical connection. The wireless content source 114 (such as a PC) could be used to send content over a wireless networking protocol for processing and transmission by the LCC 100. The communication link between the LCC 100 and the wireless content source 114 may include other radio frequency (RF) communication links such as 802.11XX or UWB.

Images transferred to the LCC 100 by any content source are processed using various image processing routines before being displayed.

Wireless RF digital transmission to the TV receiver 110 is preferable for a variety of reasons. In the preferred mode of this invention, the transmission link to the digital TV receiver 110 is achieved wirelessly by an antenna 107 on the LCC 100 transmitting to an antenna 111 connected to digital TV receiver 110. This link could also be achieved by a single low-cost coax cable. By using a transmission format compatible with the RF input of a digital TV, one can deliver a robust quality signal at low power (e.g., 200 microvolts/meter) over a short distance (e.g., up to 20 feet).

The LCC 100 can either be manually set or automatically set to avoid interfering broadcast channels in either the TV or cable transmission bands. In this way, it is possible to send a signal from the LCC 100 to the TV receiver 110 without violating FCC or other international guidelines for RF transmission. Under FCC rules, this would be allowable under a Class 15 intentionally radiating device, provided the radiating power is low enough. This process can also be used to transmit content to any number of consumer electronic devices within range.

To view the content the user would tune the digital TV to the desired TV or cable channel using instructions outlined in their TV's owner manual. For example this can be accomplished by either directly selecting channel 57 cable or instructing the TV to scan for content available on the desired frequency (cable channel 57, 421.25 MHz).

The FCC does not permit non-spurious radiated emissions in an allocated terrestrial broadcast frequency (for example channel 8, 181.25 MHz). However, non-spurious radiated emissions in a cable channel frequency band (for example channel 57, 421.25 MHz) are permitted provided the measured field strength of the emissions is low enough (i.e., less than 200 microvolts/meter). Most new digital TV are equipped to receive both digital cable and terrestrial broadcast signals at a field strength less than 200 microvolts/meter. This invention takes advantage of this recent advance in digital TVs in a fashion unintended by the industry. In the present example, the content sources are converted to a digital cable channel (e.g., channel 57 421.25 MHz) for low-power localized transmission. This invention capitalizes on the conventional digital TVs ability to demodulate either QAM or VSB signals. The LCC 100 is capable of transmodulating the content source signal from VSB to QAM or QAM to VSB for design convenience and cost savings.

Figure 2:
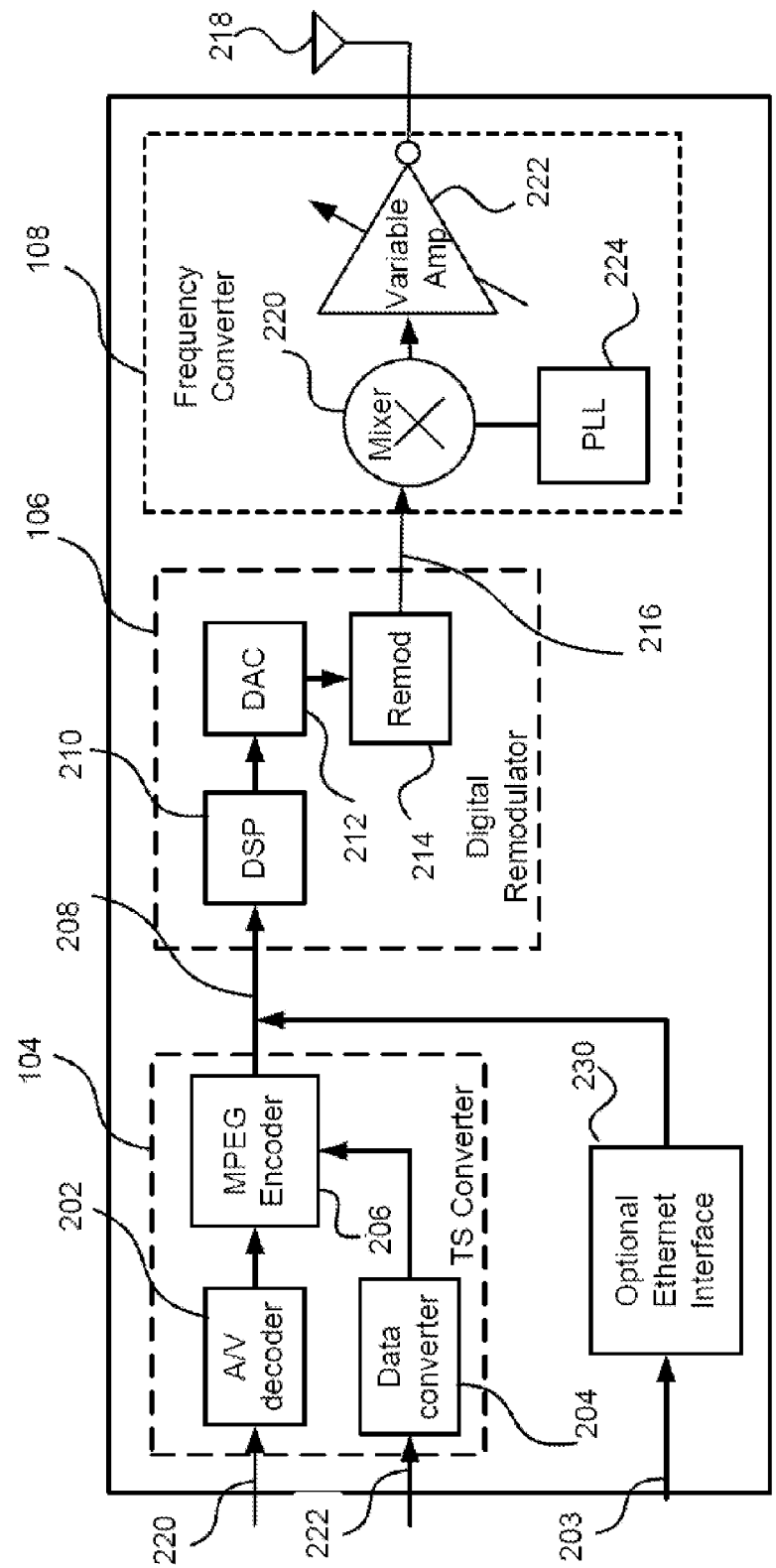
FIG. 2 is a block diagram illustration of components within the LCC designed in accordance with one implementation of the present invention.

FIG. 2 is a block diagram illustration of components within the LCC 100, designed in accordance with one implementation of the present invention. LCC 100 includes a transport stream (TS) encoder 104, a digital remodulator 106, and a frequency converter 108 that transmits the content to the TV receiver 110. Also shown is an optional Ethernet interface 230. This system takes a plurality of input streams (containing video/audio content) and converts them to a transport stream 208, applies error correction preprocessing using a DSP 210 prior to modulation 214, and provides frequency up-conversion by frequency converter 108 for low-power transmission.

Transport stream encoder 104 takes either analog or digital TV style inputs and converts them into a transport stream (TS) format. In this example, this block is comprised of an analog audio/video decoder 202, a data converter 204, and an MPEG encoder 206. The data converter 204 could be an A/D converter or and HDMI interface depending on the system implementation. This block should be able to convert any desired input type into a transport stream 208. An H.264 transport stream can also be generated. The transport stream encoder 104 is capable of handling analog TV signals 220 in composite or component formats in a variety of signal standards including NTSC, PAL, or SECAM. The transport stream encoder 104 is also capable of handling digital TV signals 222 in composite or component formats in a variety of signal standards including NTSC, PAL, or SECAM.

The digital remodulator 106 takes the transport stream 208 and creates an analog modulated signal suitable for frequency conversion by the frequency converter 108 and reception by a digital TV receiver 110. The digital remodulator 106 is comprised of a DSP 210 for error correction and other signal conditioning functions, a digital to analog converter 212, and a QAM or VSB modulator 214. The output of this section will be an IF signal at baseband 216 which is ready for the next step of frequency conversion.

The frequency converter 108 takes the IF signal 216 and heterodynes the signal into the desired transmission frequency signal using industry standard methods, using a mixer 220 and a phase locked loop (PPL) 224 frequency generator, and provides adequate signal amplification by amplifier 222 for transmission via the antenna 218. The carrier frequency could be fixed or selectable using a switch, and there may be some means of letting the user know the channel on the TV to tune to for receiving the broadcast content.

An optional Ethernet interface 230 is also shown receiving Ethernet signals 203. The input section could be wired or wireless. The Ethernet interface 230 would take the incoming stream and manipulate the stream such that the output would be a compatible transport stream 208 for further processing by the digital remodulator 106. For a lower cost solution over an Ethernet interface 230, the TS converter 104 could be removed.

Figure 3:
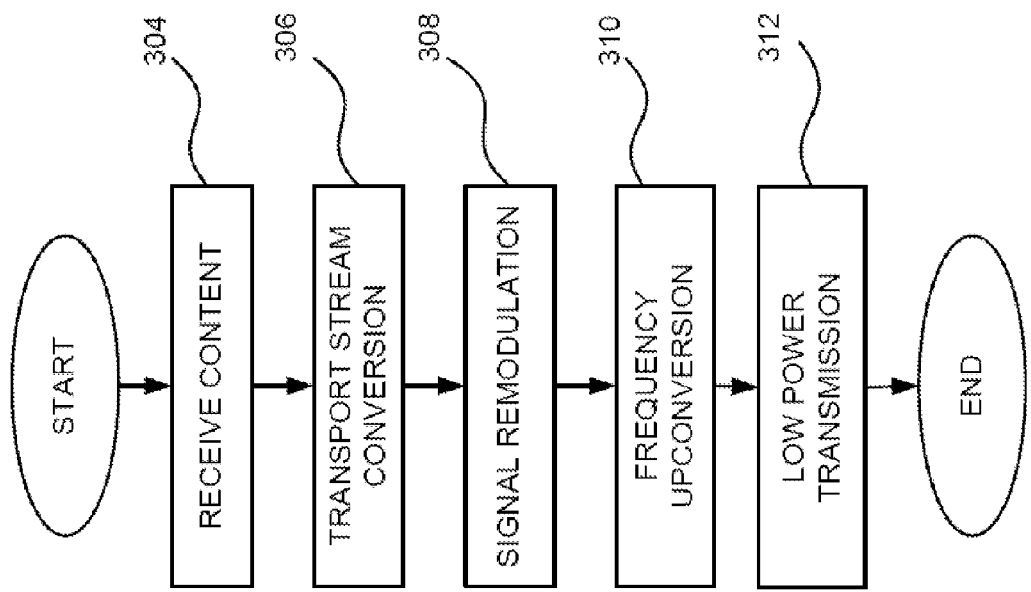
FIG. 3 is a flowchart diagram indicating the stages used by the LCC to transmit a signal for reception by the TV.

FIG. 3 is a flowchart diagram indicating the stages used to display content on television receiver 110. Initially, a user connects a content source, such as a DVD player, set top box, or VCR, to the LCC 100. If not already present, the user attaches a small antenna to the TV receiver 110. The TV receiver 110 is tuned to the desired channel either automatically or with user intervention to receive signals from the LCC 100. Using a wireless connection or a physical connection, the LCC 100 then receives content (stage 304).

Then a series of conversions is performed. The content source is converted to a transport stream (stage 306). The transport stream is fed to the process signal remodulator (stage 308), where the signal is transformed into a baseband signal compatible with the television receiver's 110 digital cable or digital terrestrial reception capabilities. The baseband signal is then up converted to the appropriate frequency band (stage 310) corresponding to the channel that the TV is set to. Finally, the signal is amplified using a lower power amplifier circuit and sent as a low power transmission (stage 312) over an antenna to the television receiver 110.

Television receiver 110 then receives content from the LCC 100 via the low power transmission. By using the LCC 100, content source material can be displayed on the TV receiver 110 without a physical wired connection.

Figure 4:
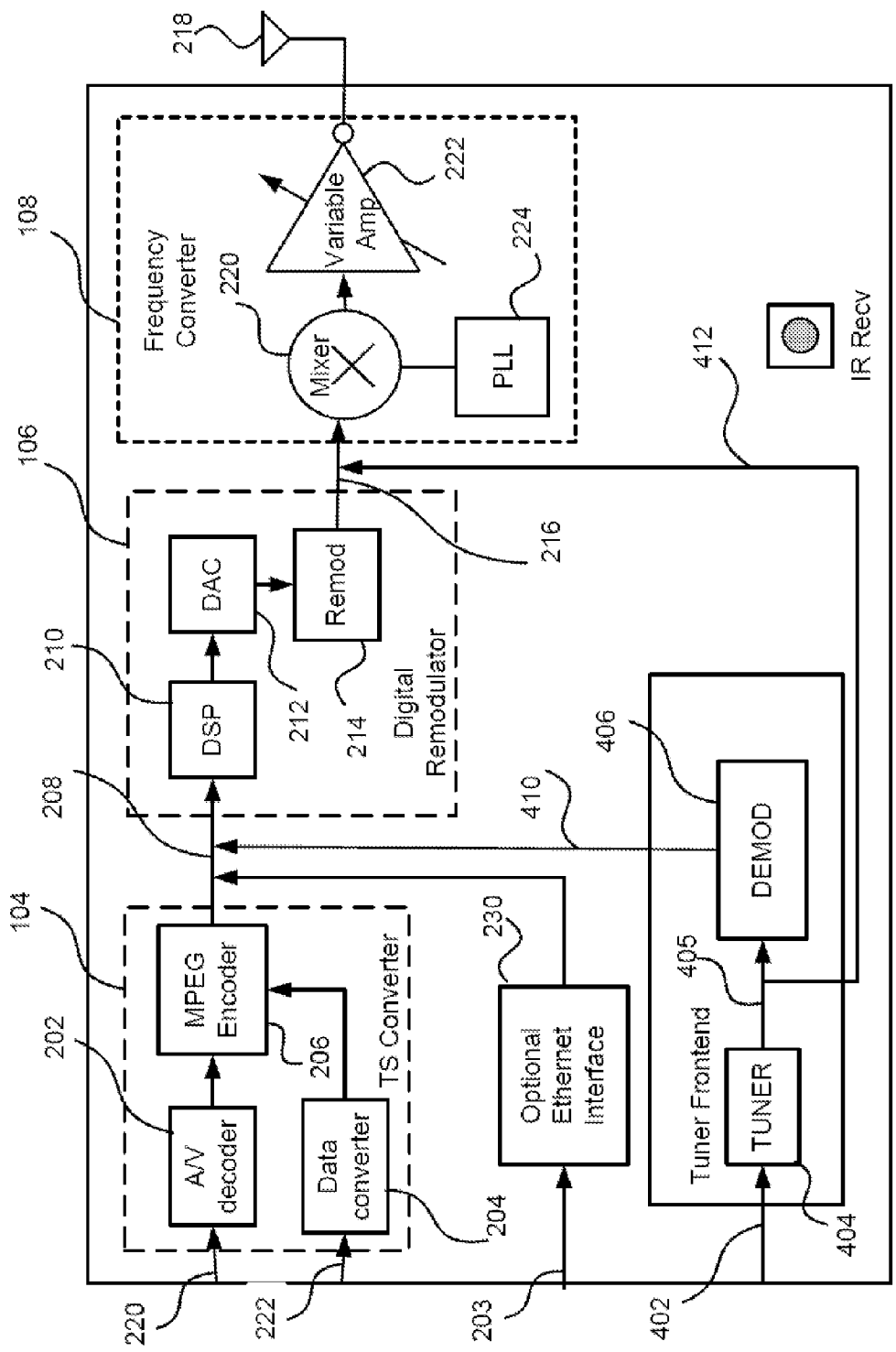
FIG. 4 is a block diagram illustration of components within the LCC designed in accordance with another implementation of the present invention including a tuner.

FIG. 4 is a block diagram illustration of components within an alternate embodiment of the LCC 100 designed in accordance with another implementation of the present invention. LCC 100 includes a transport stream (TS) encoder 104, a digital remodulator 106, and a frequency converter 108 that sends the content to the TV receiver 110. Also shown is an optional Ethernet interface 230. In addition, there is a tuner and tuner interface for additional functionality. In this embodiment, the tuner input 402 is fed to a tuner 404 to receive the desired digital TV standard. The output of the tuner 404 can be fed into a demodulator 406 for conversion into the desired transport stream format 410. The digital remodulator 106 can insert MPEG I-frames or MPEG I, B, P motion frames into the transport stream for on-screen display purposes, or still pictures, and the remodulator 106 changes the transport stream into the desired modulation output type 216. Alternatively, the tuner IF output can be fed directly to the frequency converter 108 for transmission as described earlier. The benefit of this approach is, for digital TV-only reception, it would be possible to remove the TS converter 104 entirely for a lower cost solution. Another unique attribute of this design is it transmodulates the input content source to an output content source.

Demodulator 406 could be satellite, VSB or QAM (for the US), or DVB-T or DVB-C (for Europe) to transmodulate the content source into a format compatible for the target TV receiver. For example, the demodulator 406 could demodulate a VSB signal from the tuner into a transport stream that is then remodulated into a QAM signal suitable for digital TV's with "Clear QAM" reception capabilities. Demodulation by demodulator 406 followed by remodulation by remodulator 106 into the same or a different modulation standard for the purposes of low-power transmission enables a variety of demodulators and digital TVs to be used in this invention.

The tuner 404 can scan for weak channels for optimal localized in-band transmission to the TV, as strong local channels would impact the effective range of the transmitter 218. The benefit of this design is that it is extremely efficient in handling digital broadcast signals wherein the digital input signal 402 is followed by frequency converter 108 for in-band low-power transmission to a receiving digital TV.

The frequency converter 108 has a programmable output range to accommodate any number of channels on the receiving TV in either cable or terrestrial broadcast mode of operation.

Unique to this system is the use of cable modulation standards in a low-power wireless broadcast environment. This is done to save cost, as QAM modulators are low-cost and commercially readily available. Unique to this system is the ability to place a plurality of input sources on a transport bus (as transport stream 208), followed by a digital remodulator 106 to create an IF stream for conversion to a user selectable low-power in-band transmission frequency.

This system employs a unique down-up conversion technique wherein the input tuned source goes to a tuner 404 for down conversion to an intermediate frequency, which is (after the digital remodulator 106) up converted to an in-band programmed frequency using a frequency converter 108.

This method is also capable of creating a plurality of localized/personal content channels by using many LCCs in parallel. This method could also support multiple input sources by switching the input to the LCC 100. The output of the LCC 100 could be one or a plurality of low-power RF output signals mapped to one or a plurality of RF channels.

Figure 5:
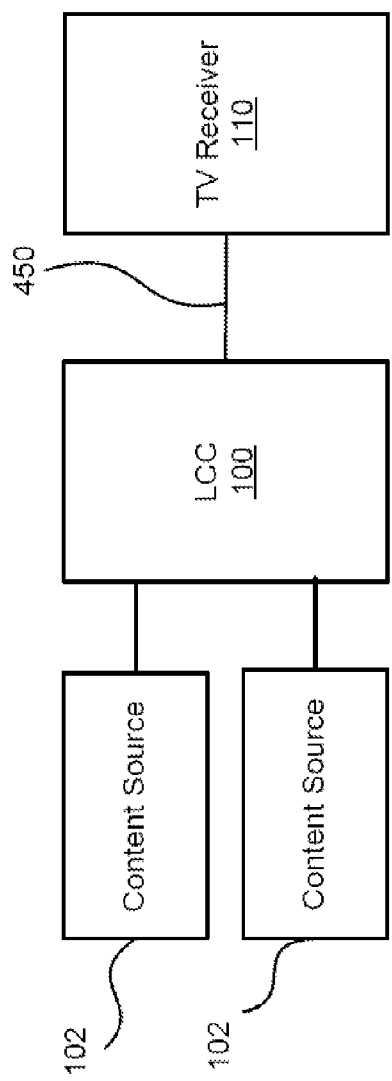
FIG. 5 is a block diagram of the LCC being directly connected to the RF input of a digital TV by a cable, such as a coaxial cable.

FIG. 5 is a block diagram of the LCC 100 receiving video/audio content from content sources 102 and suitably converting the content source original format signals to an RF signal that can be processed by the digital TV receiver 110. Instead of transmitting the RF signal using an antenna, the RF signal is directly coupled to the RF input of the TV receiver 110 using a standard coaxial cable 450. Since the RF signal is not being transmitted via the antenna, the RF signal may be any desired frequency that can be received by the TV receiver 110. Such an embodiment greatly reduces the number of cables required in order to display the video content from the content sources 102 on the TV.

Figure 6:
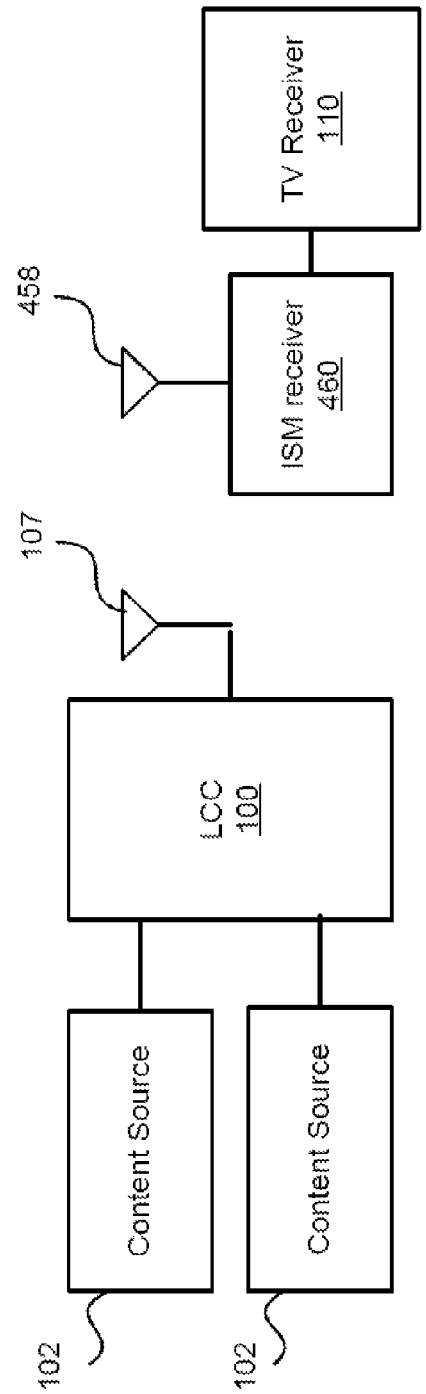
FIG. 6 is a block diagram of the LCC transmitting on an ISM band, and an ISM receiver connected to an input of the digital TV.

FIG. 6 is a block diagram of the LCC 110 transmitting on an ISM band (Industrial, Scientific, Medical band). An antenna 458 for the ISM band signals is connected to an input of an ISM receiver 460, whose output is connected to an input of the digital TV receiver 110. The ISM receiver 460 may be very small and powered by any type of power source. The ISM band is an allowable band for transmission for short distances. Examples of allowable ISM band frequencies include 900 MHz, 2.4 GHz, and 5.8 GHz. The ISM receiver 460 converts the ISM signal into a signal that can be processed by the TV receiver 110. Since the ISM receiver 460 can be configured to convert the signal into any format, the output of the ISM receiver 460 can be connected to any compatible input of the TV receiver 110.

The LCC 100 may include a conventional RF or infra-red receiver for receiving control signals from a conventional remote control to turn the LCC on or off, select the video content source, select the channel output frequency, select the range, and to control other aspects. The LCC 100 may also be controlled by a computer system using an Ethernet link, a WiFi interface, an Internet connection, or an RF interface. An automatic program running on a computer may also control the LCC 100.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of operating a system including tuning a transmitter to transmit on open channels comprising:
    receiving signals at an input of a tuner via an antenna;
    scanning the tuner across a range of channels, each channel corresponding to a frequency range;
    detecting in a first channel, within the range of channels, a signal having a strength below a certain threshold;
    receiving non-modulated first data, from at least one content source, to be transmitted;
    modulating the first data to generate a first RF signal to make suitable for wireless transmission;
    automatically controlling a transmitter to wirelessly transmit the first RF signal in the first channel such that the first RF signal can be received by at least a local first television receiver tuned to the first channel,
    wherein the first television receiver is tuned to the first channel for wirelessly receiving the first RF signal,
    receiving non-modulated second data, from the at least one content source, to be transmitted;
    modulating the second data to make suitable for wireless transmission; and
    automatically controlling the transmitter to wirelessly transmit the modulated second data, simultaneously with transmitting the modulated first data on the first channel, such that the modulated second data can be received by at least a second local television receiver.

2. The method of claim 1 wherein the signals received are broadcast signals, and the channels are broadcast channels.

3. The method of claim 1 wherein the step of receiving non-modulated first data comprises receiving non-modulated first data from a video content source, the first data containing video content, wherein the video content is an original format signal; and
    wherein the step of controlling the transmitter comprises:
        receiving the video content by a converter remote from the first television receiver;
        converting the original format signal, by the converter, to an RF transmission transmitted by the transmitter having a format capable of being demodulated by the first television receiver so that the video content is displayed on a screen of the first television receiver.

4. The method of claim 3 further comprising coupling the RF transmission to an RF input of the first local television receiver, the RF transmission having a carrier frequency within a legally allowable frequency band and signal level, wherein the first television receiver is set to an open channel to process the video content within the RF transmission.

5. The method of claim 4 wherein coupling the RF transmission to the RF input of the first local television receiver comprises receiving the RF transmission by an antenna coupled to the RF input of the first television receiver.

6. The method of claim 3 wherein the original format signal is a baseband signal.

7. The method of claim 3 wherein the format of the RF transmission is any one of NTSC, ATSC, QAM, DVB-C/T, ISDB-T, VSB, and PAL.

8. The method of claim 3 wherein the converter receives the original format signal in any one of the following formats: NTSC, PAL, SECAM, composite or component digital TV signals, CVBS, YbPbR, RGB, S-Video, and HDMI.

9. The method of claim 3 wherein the converter receives the original format signal in any one of the following formats: NTSC, PAL, SECAM, composite or component digital TV signals, CVBS, YbPbR, RGB, S-Video, and HDMI, and the converter then converts the original format signal into the RF transmission in any one of the following formats: ATSC, QAM, DVB-C/T, ISDB-T, and VSB.

10. The method of claim 3 further comprising coupling the RF transmission to an antenna coupled to an RF input of the first television receiver,
wherein the original format signal is a first RF transmission received by the converter containing the video content, and the converter converts the first RF transmission received by the converter to a desired frequency for transmission to the antenna coupled to the RF input of the first television receiver.

11. The method of claim 3 wherein the video content source is one of a plurality of video content sources coupled to the converter and applying original format signals to the converter.

12. The method of claim 3 wherein the video content sources are any of the following: a DVD player, a set top box, and a computer.

13. The method of claim 3 wherein the converter is configured to generate an MPEG or H.264 transport stream from video content sources and digitally modulate the transport stream as the RF transmission for reception by at least the first television receiver.

14. The method of claim 3 wherein the video content source is one of a plurality of video content sources coupled to the converter and applying original format signals to the converter, wherein the plurality of video content sources generate original format signals in different formats to the converter, the converter converting the different formats to a common format for the RF transmission to at least the first television receiver.

15. The system of claim 3 further comprising coupling the RF transmission to an antenna coupled to an RF input of the first television receiver,
wherein the original format signal is derived from a first RF transmission received by the converter containing the video content, wherein the converter converts the first RF transmission received by the converter into a VSB or QAM format for transmission to the antenna coupled to the RF input of the first television receiver.

16. The method of claim 3 wherein the converter adds information to the video content provided by the video content source for transmission to the first television receiver.

17. The method of claim 3 wherein the converter converts the baseband signal to an intermediate frequency (IF) signal prior to conversion to the RF transmission.

18. The method of claim 1 wherein the transmitter transmits signals to the first television receiver using at least one channel in the frequency range of 289.25 MHz-883.25 MHz.

19. The method of claim 1 wherein the transmitter transmits MPEG I frames or MPEG I, B, P motion frames for an on-screen display menu or other still pictures on the first television receiver.

20. The method of claim 1 wherein the first television receiver comprises one of a plurality of digital receivers tuned to the first channel.

21. The method of claim 1 wherein the step of scanning the tuner comprises automatically scanning the tuner.

22. The method of claim 1 further comprising the step of automatically tuning the first television receiver to the first channel for wirelessly receiving the first RF signal.

* * * * *